United States Patent [19]

Laspada

[11] Patent Number: 4,758,881
[45] Date of Patent: Jul. 19, 1988

[54] STILL VIDEO FRAME STORE MEMORY

[75] Inventor: Kathleen A. Laspada, Rochester, N.Y.

[73] Assignee: Eastman Kodak Company, Rochester, N.Y.

[21] Appl. No.: 57,066

[22] Filed: Jun. 2, 1987

[51] Int. Cl.⁴ .............................................. H04N 9/64
[52] U.S. Cl. .................... 358/21 R; 358/13; 340/798
[58] Field of Search ............. 358/11, 13, 21 R, 22; 340/798

[56] References Cited

U.S. PATENT DOCUMENTS

| | | | |
|---|---|---|---|
| 4,183,058 | 1/1980 | Taylor | 358/138 |
| 4,220,965 | 9/1980 | Heitmann et al. | 358/22 |
| 4,357,624 | 11/1982 | Greenberg | 358/22 |
| 4,432,009 | 2/1984 | Reitmeier et al. | 358/21 R |
| 4,462,024 | 7/1984 | Strolle | 340/727 |
| 4,574,277 | 3/1986 | Krause et al. | 340/703 |
| 4,580,134 | 4/1986 | Campbell et al. | 340/703 |
| 4,587,558 | 5/1986 | Sugiyama et al. | 358/21 R |
| 4,595,917 | 6/1986 | McCallister et al. | 340/703 |
| 4,620,186 | 10/1986 | Krause et al. | 340/703 |
| 4,689,660 | 8/1987 | Kashigi | 358/21 R |

FOREIGN PATENT DOCUMENTS 4670  1/1982  Japan .................................. 358/13

*Primary Examiner*—John W. Shepperd
*Attorney, Agent, or Firm*—Robert M. Wallace

[57] ABSTRACT

A still video frame store memory includes four banks of random access memory storing two-byte words, the luminance data being stored in the high bytes of all banks and two chrominance difference signals being stored in the low bytes of two of the banks. The low bytes of the remaining two banks store compressed image data corresponding to the uncompressed image data stored in the other portion of the memory. Highly efficient indirect addressing is facilitated using an address word in which the two least significant bits specify a particular one of the four memory banks and another one of the least significant bits specifies either the high or low byte.

11 Claims, 7 Drawing Sheets

| SCREEN LINE NO. | BANK 0 | | BANK 1 |
|---|---|---|---|
| 0 | P0 P2 P4 ... P510 | 0 | P1 P3 P5 ... P511 |
| 1 | P0 P2 P4 ... P510 | 1 | P1 P3 P5 ... P511 |
| 4 | P0 P2 P4 ... P510 | 4 | P1 P3 P5 ... P511 |
| 5 | P0 P2 P4 ... P510 | 5 | P1 P3 P5 ... P511 |
| 500 | P0 P2 P4 ... P510 | 500 | P1 P3 P5 ... P511 |
| 501 | P0 P2 P4 ... P510 | 501 | P1 P3 P5 ... P511 |
| 504 | P0 P2 P4 ... P510 | 504 | P1 P3 P5 ... P511 |
| 505 | P0 P2 P4 ... P510 | 505 | P1 P3 P5 ... P511 |
| 508 | P0 P2 P4 ... P510 | 508 | P1 P3 P5 ... P511 |
| 509 | P0 P2 P4 ... P510 | 509 | P1 P2 P5 ... P511 |

| | BANK 2 | | BANK 3 |
|---|---|---|---|
| 2 | P0 P2 P4 ... P510 | 2 | P1 P3 P5 ... P511 |
| 3 | P0 P2 P4 ... P510 | 3 | P1 P3 P5 ... P511 |
| 6 | P0 P2 P4 ... P510 | 6 | P1 P3 P5 ... P511 |
| 7 | P0 P2 P4 ... P510 | 7 | P1 P3 P5 ... P511 |
| 10 | P0 P2 P4 ... P510 | 10 | P1 P3 P5 ... P511 |
| 11 | P0 P2 P4 ... P510 | 11 | P1 P3 P5 ... P511 |
| 506 | P0 P2 P4 ... P510 | 506 | P1 P3 P5 ... P511 |
| 507 | P0 P2 P4 ... P510 | 507 | P1 P3 P5 ... P511 |
| 510 | P0 P2 P4 ... P510 | 510 | P1 P3 P5 ... P511 |
| 511 | P0 P2 P4 ... P510 | 511 | P1 P3 P5 ... P511 |

FIG. 4

| SCREEN LINE NO. | BANK 0 |
|---|---|
| 0 | R-Y B-Y R-Y...R-Y B-Y |
| 1 | R-Y B-Y R-Y...R-Y B-Y |
| 4 | R-Y B-Y R-Y...R-Y B-Y |
| 5 | R-Y B-Y R-Y...R-Y B-Y |
| 500 | R-Y B-Y R-Y...R-Y B-Y |
| 501 | R-Y B-Y R-Y...R-Y B-Y |
| 504 | R-Y B-Y R-Y...R-Y B-Y |
| 505 | R-Y B-Y R-Y...R-Y B-Y |
| 508 | R-Y B-Y R-Y...R-Y B-Y |
| 509 | R-Y B-Y R-Y...R-Y B-Y |

BANK 1

COMPRESSED IMAGE BUFFER

| | BANK 2 |
|---|---|
| 2 | R-Y B-Y R-Y...R-Y B-Y |
| 3 | R-Y B-Y R-Y...R-Y B-Y |
| 6 | R-Y B-Y R-Y...R-Y B-Y |
| 7 | R-Y B-Y R-Y...R-Y B-Y |
| 10 | R-Y B-Y R-Y...R-Y B-Y |
| 11 | R-Y B-Y R-Y...R-Y B-Y |
| 506 | R-Y B-Y R-Y...R-Y B-Y |
| 507 | R-Y B-Y R-Y...R-Y B-Y |
| 510 | R-Y B-Y R-Y...R-Y B-Y |
| 511 | R-Y B-Y R-Y...R-Y B-Y |

BANK 3

COMPRESSED IMAGE BUFFER

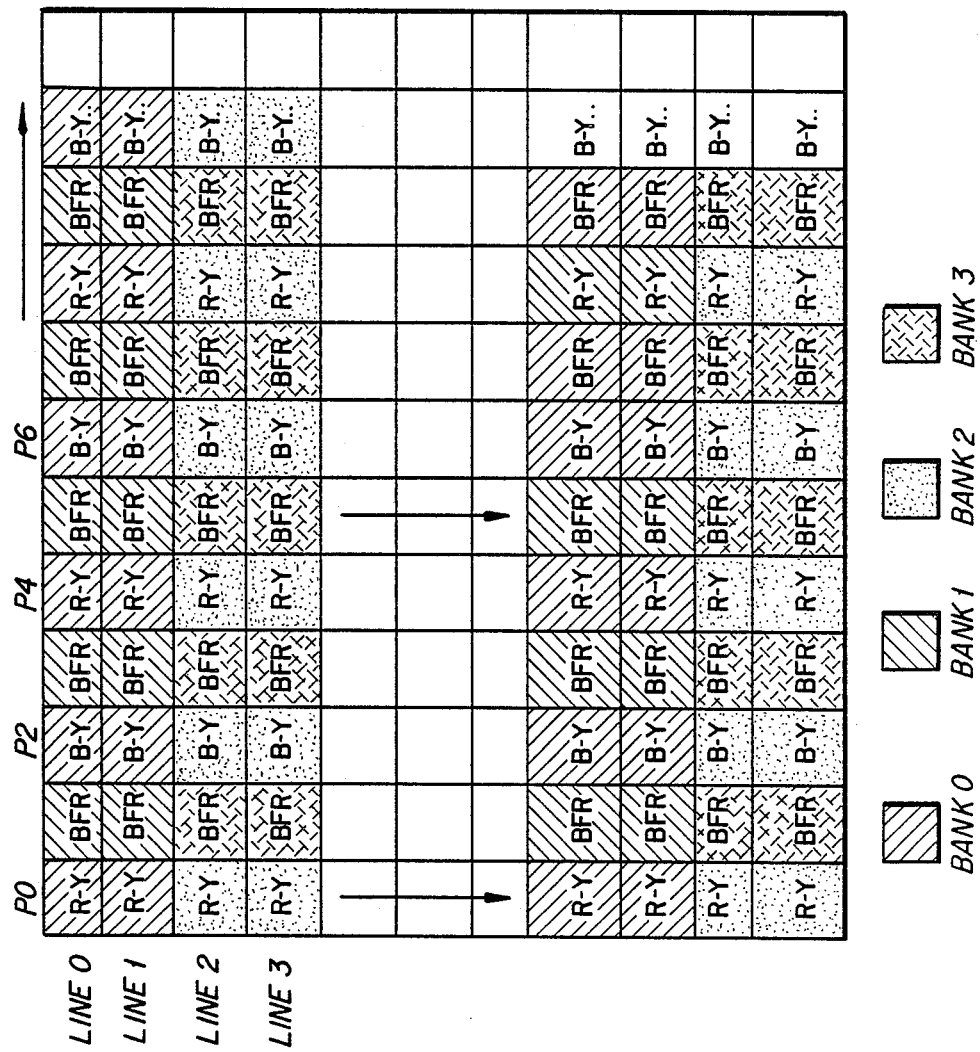

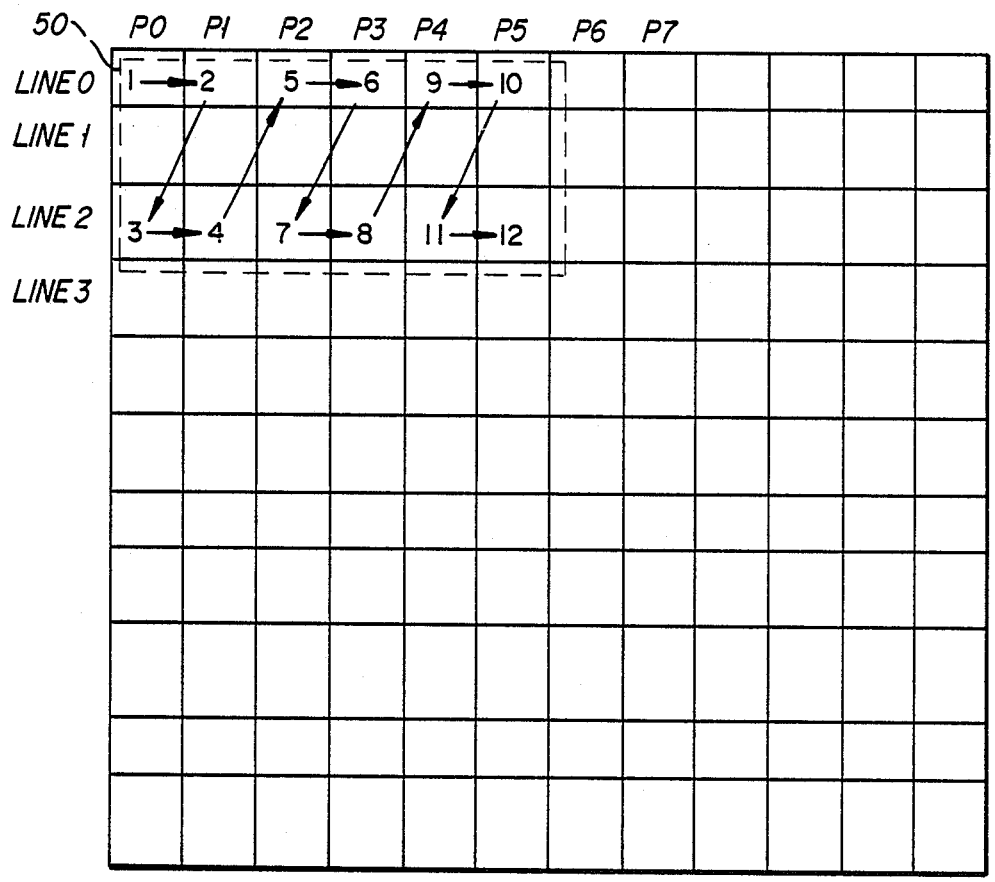

STILL VIDEO FRAME STORE MEMORY

RELATED APPLICATIONS

The subject matter of this application is related to subject matter contained in U.S. patent application Ser. No. 057,410 filed June 2, 1987 by C. T. Chen, M. Rabbani and S. J. Daly entitled "Image Transmission System with Preview Mode"; U.S. patent application Ser. No. 057,413 filed June 2, 1987 by S. J. Daly, M. Rabbani and C. T. Chen entitled "Digital Image Compression and Transmission System Employing Visually Weighted Transform Coefficients"; U.S. patent application Ser. No. 057,404 filed June 2, 1987 by S. J. Daly, C. T. Chen and M. Rabbani entitled "Adaptive Block Transform Image Coding and Apparatus"; U.S. patent application Ser. No. 057,585 filed June 2, 1987 by Vincent T. Roche, Rocco John Porcellio and Keith Aaron Hadley entitled "Dual Block Still Video Compander Processor"; U.S. patent application Ser. No. 057,595 filed June 2, 1987 by Bonnie Jo Schmitt Entitled "Still Video Transceiver Processor"; U.S. patent application Ser. No. 057,596 filed June 2, 1987 by Mojgan Rabbani and Rocco John Porcellio entitled "Image Transmission System with Line Averaging Preview Mode Using Two-Pass Block-Edge Interpolation".

BACKGROUND OF THE INVENTION

In still video transceivers capable of transmitting a full quality NTSC (National Television Standards Committee) video frame (for example) over a low bandwidth channel (such as a telephone line), there is a need to store a full quality NTSC video frame in such a manner that individual blocks of the stored data may be rapidly accessed and compressed by a data compression processor, and the resulting compressed data stored in the memory in preparation for transmission over the low bandwidth channel. The amount of uncompressed data stored in the memory, including luminance and two chrominance difference signals, is large. For example, one frame of a high quality luminance signal includes 512 rows of image pixels (each pixel typically comprising an eight bit word) and 512 columns of image pixels.

PROBLEM

To specify the entire address location of each pixel of uncompressed video data during each memory access cycle is awkward, in view of the large amount of uncompressed video data comprising each frame. The problem is how to provide a still video frame store memory in which one complete frame of high quality color NTSC video data may be easily accessed using a high speed efficient addressing scheme which does not require the compression processor to compute the address location of each individual pixel in the frame.

SUMMARY OF THE INVENTION

The invention resides in a still video image transceiver and comprises a digital frame store memory which stores luminance and chrominance difference signals. Each frame of luminance data comprises 512 rows and 512 columns of eight-bit pixels. The two chrominance difference signals comprise 256 columns by 512 rows of eight-bit pixels (reflecting a lower sampling rate). The memory is divided into four banks, each bank comprising a random access memory (RAM). Each RAM may be thought of as being divided into 256 columns and 256 rows of 16-bit words. All high bytes in each of the four banks store the luminance data. All low bytes in two of the four banks store the two chrominance difference signals. All low bytes of the remaining two banks store compressed data corresponding to the foregoing luminance and two chrominance difference signals.

SOLUTION TO THE PROBLEM

Highly efficient indirect addressing is achieved by using an indirect address word stored in an XY address register in which the two least significant bits specify one of the four banks and the remaining bits specifying a row and column within the bank. The advantage is that, by progressively incrementing or decrementing the indirect address word each memory access cycle, successive pixels of video data may be stored (or retrieved) in alternate ones of the memory banks. Moreover, in connection with this latter feature the invention provides block-by-block indirect addressing which eliminates the usual need to compute the entire address location of each pixel during each memory access cycle

DESCRIPTION OF THE DRAWINGS

The invention may be understood by reference to the accompanying drawings, of which:

FIG. 4 illustrates the hierarchy of the luminance data in the still video frame store memory;

FIG. 5 illustrates the hierarchy of the chrominance data and compressed data in the still video frame store memory;

FIG. 6 illustrates the apportionment of the luminance data among the four banks of the still video frame store memory;

FIG. 7 illustrates the apportionment of the chrominance and compressed data among the four banks of the still video frame store memory;

FIGS. 8a and 8b illustrate the XY address register used in indirect addressing; and FIG. 9 illustrates a working example of indirect addressing according to the invention.

DETAILED DESCRIPTION

Figure 1:
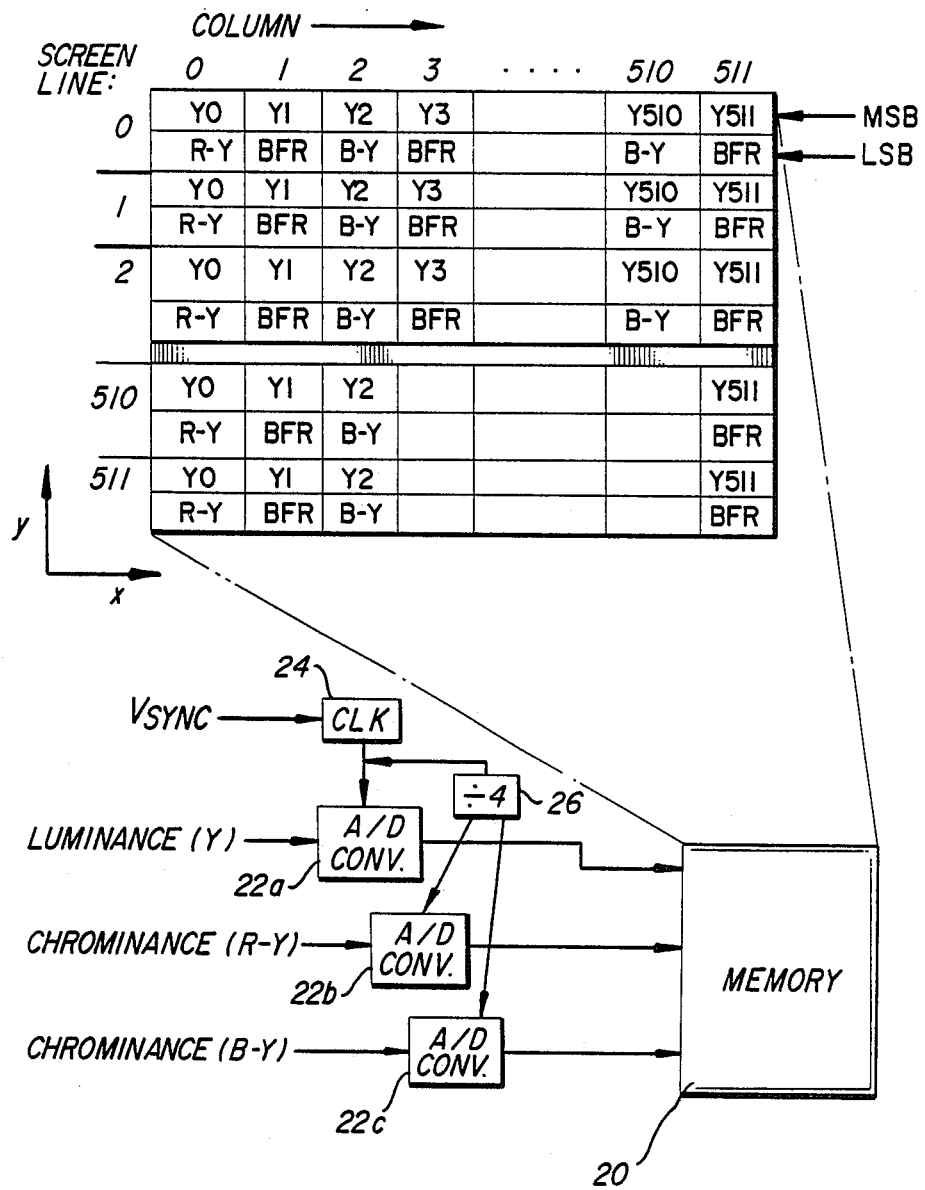
FIG. 1 is a block diagram illustrating one aspect of the architecture of the still video frame store memory.

Referring to FIG. 1, a still video frame store memory 20 stores 512 rows and 512 columns of luminance pixels of a video frame in the most significant byte (the "high byte") of each word location in memory. The "low bytes" store the two color difference signals (R-Y, and B-Y) and further serve as a buffer memory space. Alternate ones of the even-numbered columns store the R-Y color difference signal in the low byte while the remaining ones of the even numbered columns store the B-Y color difference signal in the low byte. The low bytes in each of the odd numbered columns comprise the buffer memory space which stores compressed image data.

LUMINANCE AND CHROMINANCE SAMPLING RATES

The number of bytes of each of the two color difference signals is about one quarter the number of bytes comprising the luminance signal. In order to properly sample one frame of an NTSC video signal (for example) for storage in the memory 20, the signal is divided into its luminance and two chrominance components, as illustrated in FIG. 1, each of these components being sampled by a respective luminance and chrominance analog-to-digital (A-to D) converters 22a, b, c. The digital output of each of the A-to-D converters 22 is stored in the memory 20.

The luminance A-to-D converter 22a operates at four times the sampling rate of the chrominance A-to-D converters 22b, 22c. Thus, one can imagine a master clock 24 synchronized with the vertical synchronization signal of the incoming analog video signal, the master clock 24 controlling the sampling rate of the luminance A-to-D converter 22a. A divide-by-four circuit 26 produces a secondary clock signal having one quarter the sampling rate of the master clock signal, the secondary clock signal controlling the chrominance analog-to-digital converters 22b, 22c. Of course, the simplified sampling, conversion and clocking scheme of FIG. 1 is readily implemented by a skilled worker using more practical (and complex) circuit designs, which need not to be described here.

BIT-PLANE ARCHITECTURE

Figure 2:
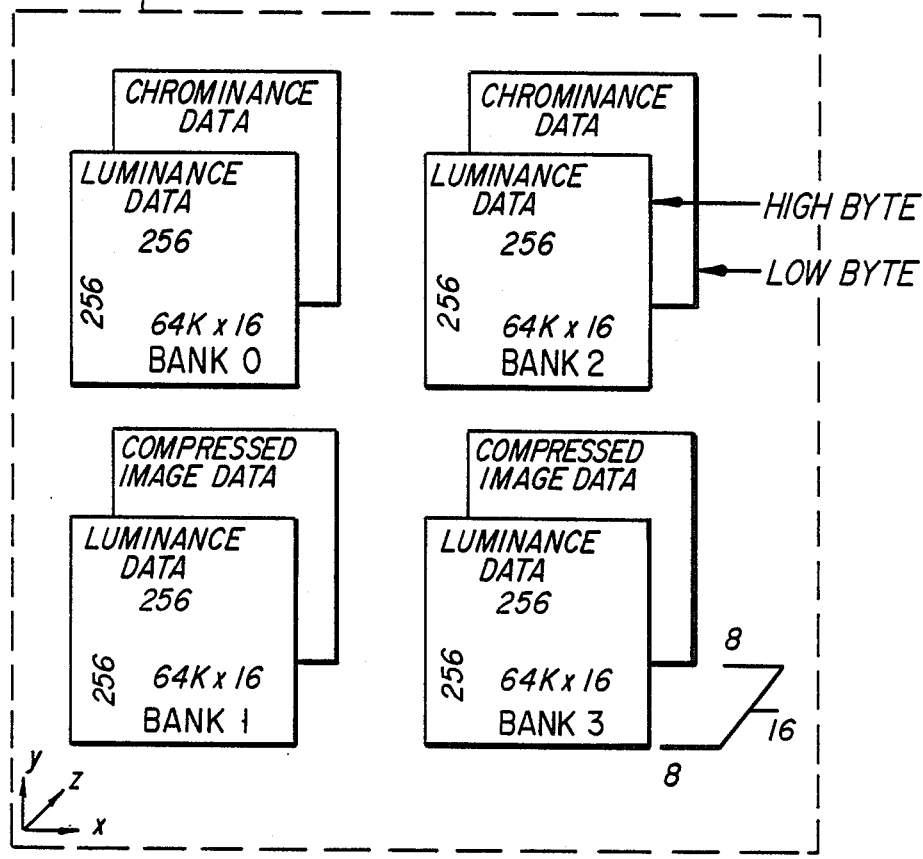
FIG. 2 is a block diagram illustrating the bit plane architecture of the still video frame store memory.

FIG. 2 illustrates one embodiment of the memory 20 of FIG. 1. The memory 20 of FIG. 2 comprises four random access memories (RAM's) storing 16-bit words, each word comprising two eight-bit bytes, a "high-byte" and a "low byte". The four RAM's are labeled bank 0, bank 1, bank 2, and bank 3. Each bank may be thought of as comprising 256 rows and 256 columns of 16-bit words. The high bytes in each of the four banks store the luminance data. The low bytes of the banks 0 and 2 store the chrominance data. The low bytes of banks 1 and 3 comprise the buffer space referred to in connection with FIG. 1 as being reserved for compression image data.

COMPRESSION PROCESSOR AND VIDEO SYSTEM CONTROLLER

Figure 3:
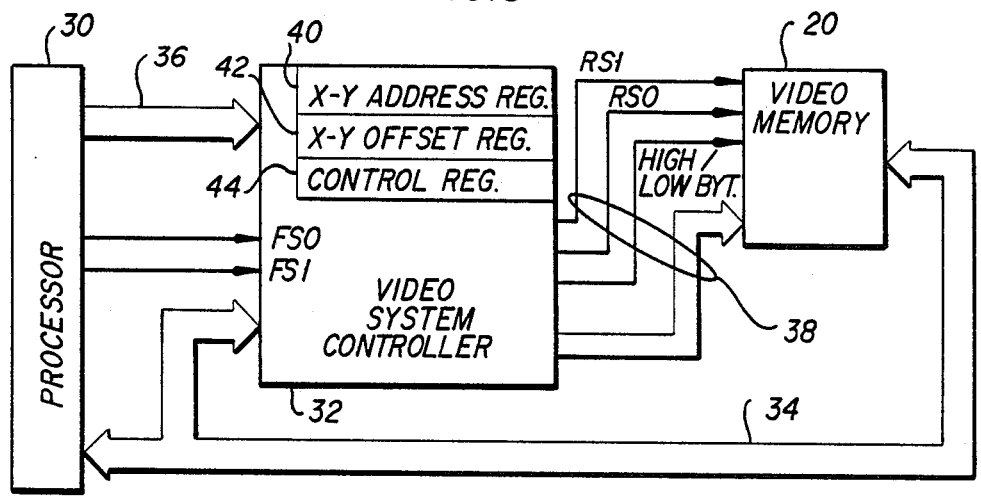
FIG. 3 illustrates the control by a proccessor through a video system controller over the still video frame store memory.

Referring to FIG. 3, a compression processor 30 operates on the luminance and chrominance data words stored in the memory 20 to produce compressed image data representing the uncompressed image data stored in the high bytes of each of the four banks and the low bytes of banks 0 and 2. The compressed image data is sufficiently compressed so that it fits within the low bytes of banks 1 and 3. The compression processor 30 accesses the video memory 20 through a video system controller 32. The video system controller 32 may be of the type well-known in the art (such as the Texas Instruments TMS 34061) and is programmable in an approximate manner to be described herein.

Data flow between the compression processor 30, the video system controller 32 and the video memory 20 is accomodated by a 16-bit data bus 34. Video data words are specified by the compression processor 30 over a 19-bit address bus 36 connected to the video system controller 32. The video system controller 32 specifies addresses in the video memory 20 over an address bus 38.

ADDRESSING INTERLACED LUMINANCE DATA

FIG. 4 illustrates how an entire frame of luminance data words is distributed among the high bytes of the four banks of the memory 20. The even numbered columns of luminance data bytes are stored in the even numbered banks, banks 0 and 2, while the odd numbered columns of the luminance data words are stored in the odd numbered banks, banks 1 and 3. Banks 0 and 1 store odd pairs of adjacent rows (video lines) of luminance data words, while banks 2 and 3 store the remaining pairs of adjacent rows of luminance data words. Thus, bank 0 stores the pair of rows, rows 0 and 1, while bank 2 stores the next pair of rows, rows 2 and 3, and so forth.

Typically, the video frame sampled by the analog-to-digital converters 22a, b, c comprises an odd field and an even field (comprising the odd and even numbered horizontal video lines, respectively) which are interlaced together when displayed on a television screen or video monitor. Usually, all video lines of an even field are received and stored in the memory 20, followed by all video lines of the odd field. With this sequence of events in mind, inspection of FIG. 4 shows that successive horizontal lines of the even luminance field are stored in alternate rows of different banks, while the horizontal lines of the odd luminance field are stored in the remaining rows. Moreover, successive pixels (bytes) in each horizontal video line are stored in the same row of alternate memory banks. For example, the even numbered pixels of line 0 are stored in bank 0 while the odd pixels of line 0 are stored in bank 1.

As will be explained in greater detail below in this specification, the advantage is that the luminance bytes are retrieved from or stored in the memory 20 in order of their appearance in the video frame with all four memory banks being accessed every two horizontal video lines. In the preferred embodiment, the least significant bits of the memory address of each location (applied on the address bus 38) specify the memory bank of that location while the remaining bits specify the particular row and column in the bank. In this preferred embodiment, simply incrementing the memory address each memory access cycle causes the specified memory location to alternate between banks, thus providing the ordered distribution of each horizontal video line and each field among the various memory banks as illustrated in FIG. 4.

STORAGE OF CHROMINANCE DATA AND COMPRESSED IMAGE DATA

FIG. 5 illustrates the allocation of the low bytes of the four memory banks as storage space for three different things, namely the R-Y color difference signal, the B-Y color difference signal and the compressed image data. The low bytes of banks 1 and 3 comprise the compressed image buffer wherein compressed image data may be stored. The even numbered columns of the low bytes of banks 0 and 2 store the R-Y color difference signal while the odd numbered columns of the low bytes of the banks 0 and 2 store the B-Y color difference signals. The rows (video lines) of the color difference (R-Y and B-Y) data words are organized in the low bytes of banks 0 and 2 such that each of the two banks stores alternate pairs of adjacent rows of video data words, as illustrated. The memory allocation of the chrominance data of the odd and even video fields is similar to that of the luminance data. The difference is that each horizontal video line of the two chrominance difference signals may be stored together in a row of a single memory bank, while the corresponding luminance line requires a row of two banks. This difference is attributable to the different sampling rates discussed previously in connection with FIG. 1.

Figure 6:
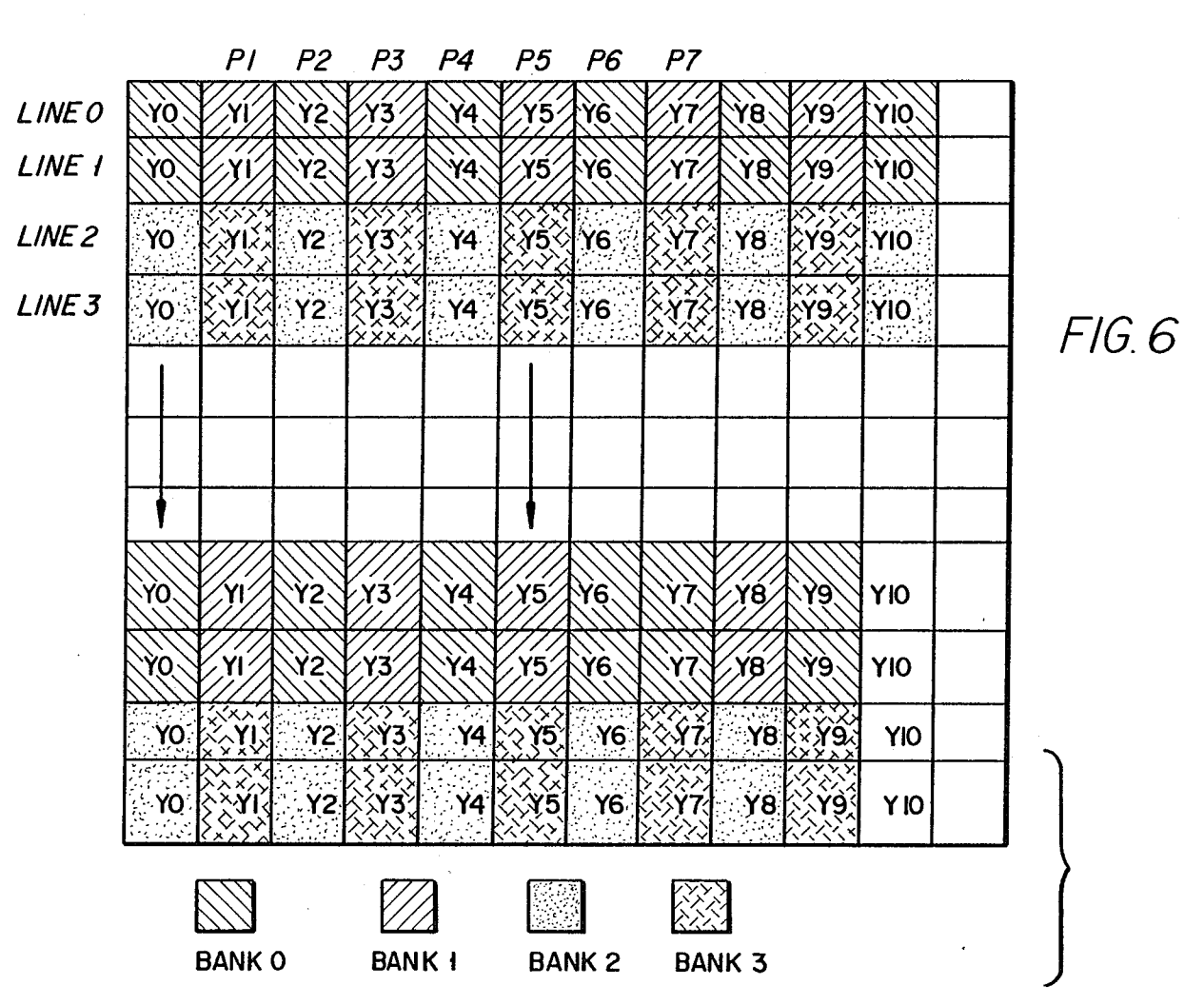

FIG. 6 illustrates the sequence in which the high bytes of each of the four banks must be addressed in order to obtain the ordered set of luminance data words. Each of the banks is coded by slanted line, dotted line or dash line symbols for ease of understanding. FIG. 6 shows generally that accessing one contiguous row of luminance data words requires alternating between two memory banks. Likewise, FIG. 7 illustrates the sequence in which the low bytes of memory banks 0 and 2 must be addressed in order to obtain the ordered set of R-Y and B-Y chrominance difference signals. A given row of R-Y or B-Y color difference bytes is accessed by switching between two different memory banks every other byte. It will be seen herein that the addressing sequences suggested by FIGS. 6 and 7 provide advantageous high speed indirect addressing in which only a portion of the address word need be changed to access subsequent video data words in the desired ordered sequence. This feature relieves the compression processor 30 from the task of computing the entire address of each video data word in a given sequence.

ADDRESS BUS

Table 1 describes the function of each bit of a nineteen-bit address word transmitted via the address bus 36 by the compression processor 30 to the video system controller 32.

TABLE 1

| Address Bit | VSC Address Line |
| --- | --- |
| A18 | Row Address 7 |
| A17 | Row Address 6 |
| A16 | Row Address 5 |
| A15 | Row Address 4 |
| A14 | Row Address 3 |
| A13 | Row Address 2 |
| A12 | Row Address 1 |
| A11 | RS 1 |
| A10 | Row Address 0 |
| A9 | Column Address 7 |
| A8 | Column Address 6 |
| A7 | Column Address 5 |
| A6 | Column Address 4 |
| A5 | Column Address 3 |
| A4 | Column Address 2 |
| A3 | Column Address 1 |
| A2 | Column Address 0 |
| A1 | RS 0 |
| A0 | High/Low Byte Select |

Table 2 illustrates the selection of one of the four memory banks in accordance with the state of the pair of the row address select lines labeled RS1 and RS0 (corresponding to address lines A11 and A1 in Table 1).

TABLE 2

| RS1 | RS0 | Bank of Memory |
| --- | --- | --- |
| 0 | 0 | Bank 0 |
| 0 | 1 | Bank 1 |
| 1 | 0 | Bank 2 |
| 1 | 1 | Bank 3 |

The compression processor 30 specifies an address identifying a particular one of the four banks, depending upon the state of the bank select lines RS0 and RS1 (address lines A11 and A1) and further identifying the high or low byte plane in that bank, according to the state of address line 0 (high/low byte select line in Table 1).

INDIRECT ADDRESSING

When the compression processor 30 desires to compress the video image represented by the video data words stored in the memory 20, it operates on blocks of the video data stored in the memory 20, one block at a time, to generate compressed video data which is then stored in the compressed image buffer. For example, each block may comprise 16 rows by 16 columns of the video data words. The luminance signal in the block would be compressed seperately, as would each of the two chrominance difference signals. In order to relieve the compression processor 30 of the task of computing the entire address word of each successive video data byte, the invention includes an indirect addressing feature using the video system controller 32 which takes maximum advantage of the unique memory architecture described above.

The video system controller 32 includes an XY address register 40 storing an indirect address word, an XY offset register 42 and a control register 44. The address of the low byte and high byte of each of these registers is given in Table 3.

TABLE 3

| Video System Controller Addresses | | |
| --- | --- | --- |
| Register Name | Low Byte | High Byte |
| Control Register | 400C0H | 400C8H |
| X-Y Offset Register | 400E0H | 400E8H |
| X-Y Address Register | 400F0H | 400F8H |

As is well-known to those skilled in the art, if the video system controller is a Texas Instruments TMS 34061 video system controller chip, then there are other video system controller registers, in addition to those listed in Table 3, which may be programmed through the microprocessor 30 in accordance with the manufacturer's specifications, which need not be described here.

In addition, the video system controller 32 responds to two control input bits, FS0 and FS1, received from the compression processor 30. In accordance with Table 4, the state of the FS0 and FS1 bit pair specifies one of three activities performed by the video system controller, namely (1) accessing registers 40 through 44 in the video system controller 32 to program the video system controller 32, (2) indirect addressing, or (3) direct addressing.

TABLE 4

| FS1 | FS0 | Function |
| --- | --- | --- |
| 0 | 0 | VSC register access |
| 0 | 1 | XY indirect addressing - Uncompressed image data block addressing (uniform block sizes) |
| 1 | 1 | Direct access - Compressed image data segment addressing (non-uniform segment lengths) |

Video system controller register access activity always precedes any of the other two activities, and is necessary in order for the compression processor 30 to "set up" the video system controller 32. The second activity, indirect addressing occurs whenever the compression processor 30 wishes to access the uncompressed video data stored in the video memory 20 without having to compute the location of each individual video data byte after each memory access cycle.

During "set-up" prior to the indirect accessing activity, the compression processor 30 furnishes the start address of a desired block of data in the memory 20 to the address register 40 and the size (i.e., eight bits) of each video data byte to be addressed during the indirect addressing activity. The compression processor 30 provides a selected one of the indirect adjustment addresses listed in Table 5 (whose role will be explained below). Values are loaded into the address register 40 and the offset register 42 by the compression processor 30 via the data bus 34. Each selected indirect adjustment address of Table 5 is transmitted by the compression processor 30 on column address lines 1, 2, 3 and 4 of the address bus 36 to the video system controller 32.

One possible configuration of the X-Y address register 40 is illustrated in FIG. 8a, in which the Y address includes 8 bits on the left side of the register, and the X address includes 10 bits on the right side of the register, the two least significant bits in the X address comprising the RS1 and RS0 banks select bits of Table 2.

TABLE 5

X-Y Indirect Adjustment Addresses

| Address | X Adjustment | Y Adjustment |
| --- | --- | --- |
| 40000H | No adjustment | No adjustment |
| 40008H | Inc X | No adjustment |
| 40010H | Dec X | No adjustment |
| 40018H | Clr X | No adjustment |
| 40020H | No adjustment | Inc Y |
| 40028H | Inc X | Inc Y |
| 40030H | Dec X | Inc Y |
| 40038H | Clr X | Inc Y |
| 40040H | No adjustment | Dec Y |
| 40048H | Inc X | Dec Y |
| 40050H | Dec X | Dec Y |
| 40058H | Clr X | Dec Y |
| 40060H | No adjustment | Clr Y |
| 40068H | Inc X | Clr Y |
| 40070H | Dec X | Clr Y |
| 40078H | Clr X | Clr Y |

An the indirect adjustment address is selected by the processor 30 from Table 5 and transmitted on column address lines 1 through 4 of the address bus 36. The indirect adjustment address specifies whether the video system controller 32 decrements or increments either or both the X and Y address portion of the indirect address word stored in the XY address register 40 at the completion of each individual memory access cycle. It should be noted that all possibilities are covered in Table 5, namely incrementing ("inc") or decrementing ("dec") either one or both the X or Y address in the XY address register 40.

It should be noted in Table 5 that the address values stated therein are useful for accessing the low byte of each word in the memory. In order to access the high byte stored in memory, each address listed in Table 5 is changed in the least significant place by substituting a 1 wherever a 0 appears, and substituting a 9 whenever an 8 appears.

The video system controller 32 further includes a control register 44 whose contents determine the configuration of the XY address register 40. For example, if the video system controller 32 is the TMS 34061 integrated circuit mentioned previously, then the control register 44 is called CNTL2. By setting byte number 7 of the CNTL 2 register 44 to zero, the XY address register 40 assumes the configuration of FIG. 8a (in which the bank select bits RS1 and RS0 are in the least significant bits of the X address). On the other hand, if bit number 7 of the CNTL 2 register 44 is set to one, then the XY address register 40 assumes the configuration illustrated in FIG. 8b (in which the bank select bits RS1 and RS0 comprise the two most significant bits of the Y address byte).

WORKING EXAMPLE

In FIG. 9, the compression processor 30 grabs a small block 50 of luminance data bytes stored in the memory 20, the block 50 extending from pixel 0 of line 0 to pixel 5 of line 2, skipping the pixels in line 1. In order to perform the addressing sequence illustrated in FIG. 9 while at the same time relieving the compression processor 30 from the task of computing the entire address word of each of the individual pixels in the block 50, the following steps are performed in accordance with the indirect addressing feature of the invention.

First, the function lines FS0 and FS1 are both set to zero, which permits the compression processor 30 to program the various registers in the video system controller 32. The compression processor 30 specifies the address of the low byte of the control register 44 (stated in Table 3 as 400C0H) on the address bus 36 and then, using the data bus 34, sets the seventh bit in the control register 44 to zero. This causes the bank select bits RS0 and RS1 to be appended onto the least significant bits of the XY address register, so that the XY address register 40 assumes the configuration of FIG. 8a.

Next, the compression processor 30 specifies the low byte of the XY offset register 42 on the address bus 36 (this address is 400E0H in Table 3) and then loads the value 40H via the data bus 34 into the offset register 42. This specifies an 8-bit byte length, so that the video system controller 32 addresses the video memory 20 in units of 8-bit bytes.

The next step is to program the X address of the first byte of the desired block 50 into the X address portion of the XY address register 40. To do this, the compression processor 30 transmits the address of the low byte of the XY address register via the address bus 36 to the video system controller 32 (this address is given as 400F0H in Table 3). Then, the compression processor 30 transmits the X address of pixel 0, line 0, block 50 (the "starting" X address in the frame store memory 20) via the data bus 34 to the video system controller 32.

In the final preparatory step, the compression processor 30 causes the Y address of the first bit in the block 50 (the "starting" Y address in the memory 20) to be entered into the Y address portion of the XY address register. To do this, the compression processor 30 transmits the address of the high bye of the XY address register 40 via the address bus 36 to the video system controller 32 (this address is given in Table 3 as 400F8H). Then, the compression processor 30 transmits the Y address of the first byte in the block 50 via the data bus 34 to the video system controller 32.

The video system controller 32 is now ready to perform the addressing sequence illustrated in FIG. 9. The compression processor 30 changes the state of the FS0 and FS1 bit to 01 (see Table 4) to begin the indirect addressing sequence. At the same time, it transmits that indirect adjustment address from Table 5 which calls for incrementing the X address by the value stored in the offset register, with no adjustment to the Y address.

(This is the second indirect adjustment address listed in Table 5, namely 40008H.)

From FIG. 9, it is seen that the memory address switches from one memory bank to another memory bank every memory access cycle (comparing FIG. 9 with FIG. 6). This is a consequence of the bank select bits RS0 and RS1 being located in the least significant bits of the X address in the XY address register 40 of FIG. 8A and as a further consequence of the value 40H (i.e., eight bits) having been entered into the XY offset register 42.

From the simple example of FIG. 9, the extraordinary flexibility of the indirect addressing method in the memory architecture of the invention is apparent, as is the savings in processor time resulting from the relief afforded the compression processor 30 from having to compute the address of each individual byte in the block 50.

DIRECT ADDRESSING

The compression processor 30 divides the entire frame of video data stored in the memory 20 into many blocks (such as the block 50 of FIG. 9) and compresses the entire image by compressing each individual block. It stores the compressed data in an organized fashion in the compressed image buffer of the memory 20 (see FIG. 2). Since the amount of compressed data representing each block cannot be predetermined—because it is a function of the spatial frequency content of each block—an indirect addressing scheme is not particularly useful for fetching compressed image data from the compressed image buffer. Instead, the compression processor 30, in order to address compressed data in the compressed image buffer, must compute the individual address of each byte stored in the compressed image buffer. The address of each byte is transmitted via the address bus 18 to the video system controller 32, which in turn transmits the address word to the memory 20. In direct addressing, the compression processor 30 may increment the memory location by one column by incrementing the address word of Table 1 by 04H, and may increment the memory location by one row by incrementing the address word of Table 1 by 400H.

The example described in the accompanying drawings includes fairly specific references to numbers of columns and rows of video data bytes, byte length, and specific register addresses and indirect adjustment addresses stated in hexadecimal. The specific numbers used in this example are not material to the invention, and another example may be chosen in which the number of bytes and the various addresses are different from that given in the example. Furthermore, the apportioning of luminance bytes, chrominance bytes and compressed image data among the various memory banks and among the various high and low bytes in each of these banks may be different from that described in FIGS. 2 through 7, without departing from the invention. Accordingly, while the invention has been described in detail by reference to preferred embodiments thereof, other variations and modifications may be made without departing from the spirit and scope of the invention.

What is claimed is:

1. A still video frame store memory, comprising:
a plurality of memory banks, each of said banks comprising a plurality of data word storage locations, each of said locations being divisible into first and second byte locations;

analog-to-digital converter means for sampling a selected frame of a color video signal, and producing therefrom a set of luminance bytes characterized by a luminance digital rate and first and second sets of chrominance different bytes, each characterized by a chrominance digital rate less than said luminance digital rates; and memory addressing means for:
  a. storing said luminance bytes in said first byte locations of each of said banks;
  b. storing said first chrominance difference bytes in alternate ones of said second byte locations in selected ones of said banks;
  c. storing said second chrominance difference bytes in the remaining ones of said second byte locations in said selected banks, whereby the ratio of the number of byte locations storing said luminance bytes and storing said chrominance bytes corresponds to the ratio of said luminance and chrominance digital rates, wherein the byte locations in each bank are organizable in columns and rows of said byte locations, and wherein said addressing means is adaptable to perform indirect addressing, said addressing means further comprising:

a programmable offset register storing the bit length of the bytes in said banks;

a programmable address register including means for storing a column address byte, a row address byte and a plural bit code designating one of said plurality of said banks; and a programmable control register including means for indicating whether said plural bit code is to be appended to said column address byte or to said row address byte and whether it is to be appended as the most significant bits or the least significant bits thereof;

means for receiving a column start address and a row start address and for receiving an indirect adjustment address, whereby said addressing means is adaptable to address a byte location corresponding to said starting row and column addresses during a first memory access cycle and to successively increment one or both of said row and column aaddresses in accordance with said indirect adjustment address once during each subsequent memory access cycle by an amount corresponding to the contents of said offset register.

2. The still video frame store memory of claim 1, wherein said selected frame is characterized by a pair of interlaced fields of horizontal video lines, and wherein said addressing means is adaptable for:
  a. addressing alternate pairs of said rows of said byte locations in alternate ones of said banks during receipt of a corresponding pair of horizontal lines of one of said fields;
  b. addressing the remaining pair of said rows of said byte locations in said alternate banks during receipt of a corresponding pair of horizontal lines of the other said fields, whereby alternate pairs of horizontal lines of said video frame are stored throughout the banks of said memory.

3. The still video frame store memory of claim 2, wherein a host processor is provided which is adapted to control said addressing means, wherein said addressing means is further adaptable for:
  addressing said rows of byte locations in order of thier appearance in said selected frame whenever data stored in said memory is to be retrieved or transmitted to said host processor, wherein said host processor may indirectly address all contiguous bytes in a selected sub-block of said frame without having to directly compute the address of each of said contiguous bytes.

4. The still video frame store memory of claim 3 wherein said control register indicating means indicates said plural bit code is appended as the least significant bits of said column address bytes, whereby said host processor transmits (to said means for receiving) an indirect adjustment address specifying incrementation of said column address each memory access cycle, whereby said bank designating code therein changes with the incrementation of said column address by said addressing means, whereby said host processor may indirectly address all of said byte locations in the appropriate sequence without directly computing the address of each such byte location.

5. The still video frame store memory of claim 4 wherein said plurality of memory banks comprise four memory banks, said selected banks storing said chrominance difference signals in said second byte locations comprise two of said four memory banks, and said luminance digital rate is four times that of said chrominance digital rate.

6. A still video frame store memory comprising:
  a plurality of memory banks, each of said banks comprising a plurality of data word storage locations, each of said locations being divisible into first and second byte locations, a portion of some of said banks being reserved as a compressed image buffer;
  a host processor adaptable to receive compressed color video data, store it in said compressed image buffer, and to retrieve and expand it to produce therefrom luminance bytes characterized by a luminance digital rate and first and second chrominance difference bytes each characterized by a chrominance digital rate less than said luminance digital rate; and
  memory addressing means responsive to said host processor for:
    a. storing said luminance bytes in said first byte locations of each of said banks;
    b. storing said first chrominance difference bytes in alternate ones of said second byte locations in selected ones of said banks;
    c. storing said second chrominance difference bytes in the remaining ones of said second byte locations in said selected banks, wherein said compressed image buffer comprises the second byte locations of banks other than said selected banks, whereby the ratio of the number of byte locations storing said luminance bytes and storing said chrominance bytes corresponds to the ratio of said luminance and chrominance digital rates.

7. The still video frame store memory of claim 6 wherein the byte location in each bank are organizable in columns and rows of said byte locations, and wherein said addressing means is adaptable to perform indirect addressing, said addressing means further comprising:
  a programmable offset register storing the bit length of the bytes in said banks;
  a programmable address register including means for storing a column address byte, a row address byte and a plural bit code designating one of said plurality of said banks; and
  a programmable control register including means for indicating whether said plural bit bank designating code is to be appended to said column address byte or to said row address byte and whether it is to be appended as the most significant bit or the least significant bit thereof;
  means for receiving a column start address and a row start address and for receiving an indirect adjustment address, whereby said addressing means is adaptable to address a byte location corresponding to said starting row and column addresses during a first memory access cycle and to successively increment one or both of said row and column addresses in accordance with said indirect adjustment address during each subsequent memory access cycle by an amount corresponding to the contents of said offset register.

8. The still video frame store memory of claim 7, wherein said selected frame is characterized by a pair of interlaced fields of horizontal video lines, and wherein said addressing means is adaptable for:
  a. addressing alternate pairs of said rows of said byte locations in alternate ones of said banks during receipt of a corresponding pair of horizontal lines of one of said fields;
  b. addressing the remaining pairs of said rows of said byte locations in said alternate banks during receipt of a corresponding pair of horizontal lines of the other said fields, whereby alternate pairs of horizontal lines of said video frame are stored throughout the banks of said memory.

9. The still video frame store memory of claim 8, wherein said addressing means is further adaptable for:
  addressing said rows of byte locations in order of their appearance in said selected frame whenever data expanded by said host processor is to be stored in said memory, wherein said host processor may indirectly address all the contiguous bytes in a selected sub-block of said frame without having to directly compute the address of each of said contiguous bytes.

10. The still video frame store memory of claim 8 wherein said control register indicating means indicates said plural bit bank designating code is appended as the least significant bits of said column address bytes in, whereby said host processor transmits (to said means for receiving) an indirect adjustment address specifying incrementation of said column address each memory access cycle, whereby said bank designating code therein changes with the incrementation of said column address by said addressing means, whereby said host processor may indirectly address all of said byte locations in the appropriate sequence without directly computing the address of each such byte location.

11. The still video frame store memory of claim 4 wherein said plurality of memory banks comprises four memory banks, said selected banks storing said chrominance difference signals in said second byte locations comprise two of said four memory banks, and said luminance digital rate is four times that of said of said chrominance digital rate.

* * * * *